US007324697B2

(12) United States Patent
Kazui et al.

(10) Patent No.: US 7,324,697 B2
(45) Date of Patent: Jan. 29, 2008

(54) DATA EMBEDDING DEVICE AND DATA EXTRACTION DEVICE

(75) Inventors: Kimihiko Kazui, Kawasaki (JP); Akira Nakagawa, Kawasaki (JP); Eishi Morimatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 646 days.

(21) Appl. No.: 10/637,587

(22) Filed: Aug. 11, 2003

(65) Prior Publication Data
US 2004/0032969 A1    Feb. 19, 2004

(30) Foreign Application Priority Data
Aug. 13, 2002    (JP)    ............... 2002-235470

(51) Int. Cl.
*G06K 9/36* (2006.01)
(52) U.S. Cl. ............... 382/236; 382/232; 382/100
(58) Field of Classification Search ............... 382/100, 382/232, 233, 236, 284, 291; 341/94; 375/240.12
See application file for complete search history.

(56) References Cited

U.S. PATENT DOCUMENTS

| 5,008,747 | A | * | 4/1991 | Carr et al. ............... 375/240.12 |
| 5,960,081 | A | | 9/1999 | Vynne et al. ............... 713/176 |
| 6,192,139 | B1 | * | 2/2001 | Tao ............... 382/100 |
| 6,384,749 | B1 | * | 5/2002 | Park ............... 341/94 |
| 6,643,414 | B1 | * | 11/2003 | Kadono ............... 382/291 |

FOREIGN PATENT DOCUMENTS

WO    WO98/17061    4/1998

OTHER PUBLICATIONS

Choong-Hoon Lee, et al., "Adaptive Video Watermarking Using Motion Information"; Proceedings of SPIE, The International Society for Optical Engineering SPIE-Int. Soc. Opt. Eng. USA, vol. 3971 (2000), pp. 209-216, XP002404465.
Gary Sullivan, "Draft Text of Recommendation H.263 Version 2 ("H.263+") for Decision," Jan. 27, 1998, International Telecommunication Union, Telecommunication Standardization Sector, Study Period 1997-2000; XP-000982914; page (#21 Complete Text with Change Marks Version).
European Patent Office Search Report dated Nov. 23, 2006 for European Application No. 03255022.0—1522 that corresponds to the present pending US patent application (4 pages).

* cited by examiner

*Primary Examiner*—Duy M. Dang
(74) *Attorney, Agent, or Firm*—Staas & Halsey LLP

(57) ABSTRACT

A data embedding device includes a dynamic image storage unit storing inter-frame prediction coded dynamic image data, an embedding data storage unit storing embedding data that is embedded into the inter-frame prediction coded dynamic image data, and an embedding unit embedding the embedding data into a rounding direction flag contained per frame data in the inter-frame prediction coded dynamic image data.

21 Claims, 8 Drawing Sheets

DATA EMBEDDING DEVICE AND DATA EXTRACTION DEVICE

BACKGROUND OF THE INVENTION

The present invention relates to a device for embedding information into a coded dynamic image, and a device for reading the information embedded into the coded dynamic image.

There have hitherto been techniques for embedding data into inter-frame prediction coded dynamic image data (which will hereinafter be simply called the [coded dynamic image data]). Examples of techniques for generating the coded dynamic image data are ISO/IEC (International Organization for Standardization/International Electrotechnical Commission), MPEG-1, 2, 4 (Moving Pictures Experts Group Phase1, Phase2, Phase4) and ITU-T (International Telecommunication Union-Telecommunication Standardization Sector) H.263 Version.2.

Metadata is an example of the data embedded into the coded dynamic image data. The metadata is defined as data for describing properties and features of media, i.e., the data about the data. The metadata is embedded into the coded dynamic image data, there by making it possible to notify an individual user of information about a dynamic image and to provide a service for improving the user friendliness.

SUMMARY OF THE INVENTION

By the way, in the case of providing the user with the coded dynamic image data into which the metadata corresponding to the individual user is embedded, the metadata to be embedded changes corresponding to each user It is therefore impossible to prepare the coded dynamic image data into which the metadata has been embedded beforehand. Namely, it is required that the metadata meeting a demand of the user be embedded into original image data (dynamic image data that is not coded) or the coded dynamic image data each time a request for the coded dynamic image data is given from the user.

Further, it is desirable that a load on a device for generating the coded dynamic image data containing the embedded data be small in order to actualize transmitting the coded dynamic image data containing the data embedded in realtime via a network and displaying (decoding) the same data on other device.

Generally, a process of coding the dynamic image data involves a large load upon the device. Hence, in the case of coding after the data has been embedded into the original image data, the load on the device increases. Accordingly, in this case, it is difficult to transmit the coded dynamic image data containing the embedded data in realtime via a network. By contrast, the case of embedding the data into the coded dynamic image data has a less load applied upon on the device than in the case of embedding the data into the original image data. It is therefore desirable for the realtime transmission that the latter scheme be adopted.

Further, it is also desirable that a data size of the coded dynamic image data before embedding the data be the same as a data size thereof after embedding the data. The following is an elucidation of the reason why it is desirable that the data sizes be the same.

The realtime distribution of the coded dynamic image data involves segmenting the coded dynamic image data for packetization. At this time, if the data is segmented in arbitrary positions, it is difficult to immediately decode the subsequent coded dynamic image data when an error occurs on a transmission path. Therefore, a data position (that is normally a head of the frame) for segmentation is detected by analyzing the coded dynamic image data. The user of a hint track, however, eliminates the necessity of analyzing the segmenting position of the coded dynamic image data. The hint track previously indicates a data position for segmenting the coded dynamic image data when packetizing the coded dynamic image data. The coded dynamic image data is segmented in the position indicated by the hint track, whereby the coded dynamic image data can be segmented without the analysis. This scheme reduces the load required for packetizing the coded dynamic image data.

If the data size of the coded dynamic image data changes, however, the data position for segmenting the coded dynamic image data changes. Hence, if the data size of the coded dynamic image data varies, the hint track cannot be used. Therefore, the analysis for segmenting the coded dynamic image data is required, resulting in a rise in the load needed for the packetization.

Accordingly, it is a primary object of the present invention, which was devised to obviate the problems described above, to provide a device for embedding arbitrary data into the coded dynamic image data without changing a data size.

To accomplish the above object, according a first aspect of the present invention, a data embedding device includes a dynamic image storage unit storing inter-frame prediction coded dynamic image data, an embedding data storage unit storing embedding data that is embedded into the inter-frame prediction coded dynamic image data, and an embedding unit embedding the embedding data into a rounding direction flag contained per frame data in the inter-frame prediction coded dynamic image data.

According to the first aspect of the present invention, the embedding data is embedded into the value of the rounding direction flag of the inter-frame prediction coded dynamic image data. Hence, there is any change neither in a data size of the inter-frame prediction coded dynamic image data before the embedding data is embedded nor in a data size of the inter-frame prediction coded dynamic image data after the embedding data has been embedded. It is therefore feasible to embed the arbitrary data into the inter-frame prediction coded dynamic image data without changing the data size.

The embedding unit according to the first aspect of the present invention may include an exclusive OR calculating unit calculating an exclusive OR of a value of the rounding direction flag and a value of the embedding data, and a replacing unit replacing the rounding direction flag value defined as a value contained in the inter-frame prediction coded dynamic image data and used as an input of the exclusive OR calculating unit, with a value of a result of the. calculation by the exclusive OR calculating unit The embedding unit according to the first aspect of the present invention may further include a detecting unit detecting a rounding direction flag having "1" as a corresponding embedding data value among the rounding direction flags corresponding to respective bits structuring the embedding data, and the exclusive OR calculating unit may perform the exclusive OR calculation with respect only the rounding direction flag detected by the detecting unit.

The embedding unit according to the first aspect of the present invention may include a detecting unit detecting a rounding direction flag having "1" as a corresponding embedding data value among the rounding direction flags corresponding to respective bits structuring the embedding data, and an inverting unit inverting a value of the rounding direction flag detected by the detecting unit.

The detecting unit according to the first aspect of the present invention may include a bit position detecting unit detecting an offset value of a bit of which a value is "1" from a head bit of the embedding data, a frame number detecting unit detecting a frame number of an embedding target frame into which the embedding data is embedded, in the inter-frame prediction coded dynamic image data, and a judging unit judging, if the offset value and the frame number are coincident with each other, that the rounding direction flag contained in the target frame is the rounding direction flag with "1" as a corresponding embedding data value.

The data embedding device according to the first aspect of the present invention may further include an auxiliary information managing unit managing auxiliary information indicating which bit pattern of one or more bit patterns a pattern specified by the value of the rounding direction flag in the continuous frames is defined as, or indicating which bit pattern a bit pattern of a value of the rounding direction flag in the inter-frame prediction coded dynamic image data serving as a processing target by the embedding unit is defined as.

The data embedding device according to the first aspect of the present invention may further include a transmitting unit transmitting to other device the data outputted from the embedding unit, and an auxiliary information transmitting unit transmitting the auxiliary information to other device by utilizing a method different from that of the transmitting unit.

The embedding unit according to the first aspect of the present invention may further include a segmenting unit segmenting the embedding data into plural pieces of sub embedding data, an invert judging unit judging whether the sub embedding data should be inverted so as to uniformize a 1-and-0 distribution in the rounding direction flags contained in the inter-frame prediction coded dynamic image data, an inverting unit inverting the relevant sub embedding data on the basis of the judgement by the invert judging unit, and a replacing unit replacing the sub embedding data inverted or not inverted by the inverting unit with the rounding direction flag of the continuous frames of which the number is the same as a bit number of this sub embedding data.

The replacing unit according to the first aspect of the present invention may further replace an invert flag indicating whether the processing target sub embedding data is the inverted data or not, with the rounding direction flag in the continuous frames of which the number is the same as the bit number of this invert flag, this rounding direction flag not being inverted with the sub embedding data.

The segmenting unit according to the first aspect of the present invention may segment the embedding data into the sub embedding data having a predetermined bit number.

The replacing unit according to the first aspect of the present invention may replace the rounding direction flag in the frame continuous with the frame containing the rounding direction flag replaced with the sub embedding data segmented by the predetermined bit number, with the invert flag.

The data embedding device according to the first aspect of the present invention may further include a transmitting unit transmitting to other device the data outputted from the embedding unit, and an auxiliary information transmitting unit transmitting auxiliary information indicating the predetermined bit number to other device by utilizing a method different from that of the transmitting unit.

The invert judging unit according to the first aspect of the present invention may include a biased degree calculating unit calculating a biased degree in the sub embedding data by subtracting a value obtained by dividing a value of the bit number by "2" from a total value of respective bit values of the sub embedding data, a biased degree accumulation storing unit storing a biased degree accumulation value necessary for embedding the data, and an invert flag judging unit judging whether the sub embedding data should be inverted or not by comparing the biased degree in the processing target sub embedding data with the biased degree accumulation value.

The invert judging unit according to the first aspect of the present invention may further include a biased degree accumulation calculating unit calculating a biased degree accumulation value in the next sub embedding data by adding a biased degree accumulation value in the processing target sub embedding data of the continuous sub embedding data, a value, corresponding to a result of the judgement by the invert flag judging unit, in the processing target sub embedding data, and a multiplied value of the biased degree.

According to a second aspect of the present invention, a data extraction device includes a storing unit storing inter-frame prediction coded dynamic image data with embedding data embedded into a rounding direction flag, and an extracting unit extracting the embedded data from the rounding direction flag of the inter-frame prediction coded dynamic image data by use of data for extraction.

According to a third aspect of the present invention, a data extraction device includes a dynamic image storing unit storing inter-frame prediction coded dynamic image data with embedding data embedded into a rounding direction flag, a pattern storing unit storing bit pattern information for specifying a bit pattern of the rounding direction flag in continuous frames of the inter-frame prediction coded dynamic image data before the embedding data has been embedded, and a calculating unit calculating an exclusive OR of the bit pattern specified by the bit pattern information and a value of the rounding direction flag of the inter-frame prediction coded dynamic image data.

The data extraction device according to the third aspect of the present invention may further include an auxiliary information storing unit storing auxiliary information indicating which bit pattern information among plural pieces of bit pattern information should be used, wherein the pattern storing unit may store the plural pieces of bit pattern information, and the calculating unit may perform the calculation by use of the bit pattern specified by the bit pattern information indicated by the auxiliary information, among the plural pieces of bit pattern information stored on the pattern storing unit.

According to a fourth aspect of the present invention, a data extraction device includes a dynamic image storing unit storing inter-frame prediction coded dynamic image data into which embedding data embedded, a frame segmenting unit segmenting a continuous frame in the inter-frame prediction coded dynamic image data into a plurality of sub-frames, an extracting unit extracting a value of a rounding direction flag of the inter-frame prediction coded dynamic image data from each of the sub-frames, an invert judging unit judging whether a value of the rounding direction flag in the sub-frame should be inverted or not, and an inverting unit inverting the value of the rounding direction flag in the relevant sub-frame on the basis of the judgement by the invert judging unit, and outputting the inverted value as the embedding data.

The frame segmenting unit according to the fourth aspect of the present invention may segment the continuous frame into the sub-frames having a predetermined frame count.

The data extraction device according to the fourth aspect of the present invention may further include an auxiliary information receiving unit receiving auxiliary information corresponding to the predetermined frame count.

The invert judging unit according to the fourth aspect of the present invention may judge based on a value of the invert flag embedded into the rounding direction flag of the frame not segmented into the sub-frames.

BRIEF DESCRIPTION OF THE DRAWINGS

These objects and advantages of the present invention will become more apparent and more readily appreciated from the following detailed description of the presently preferred exemplary embodiments, taken in conjunction with the accompanying drawings of which.

DETAILED DESCRIPTION OF THE PREFERRED EMBODIMENTS

[Principle of Operation]

Figure 1:
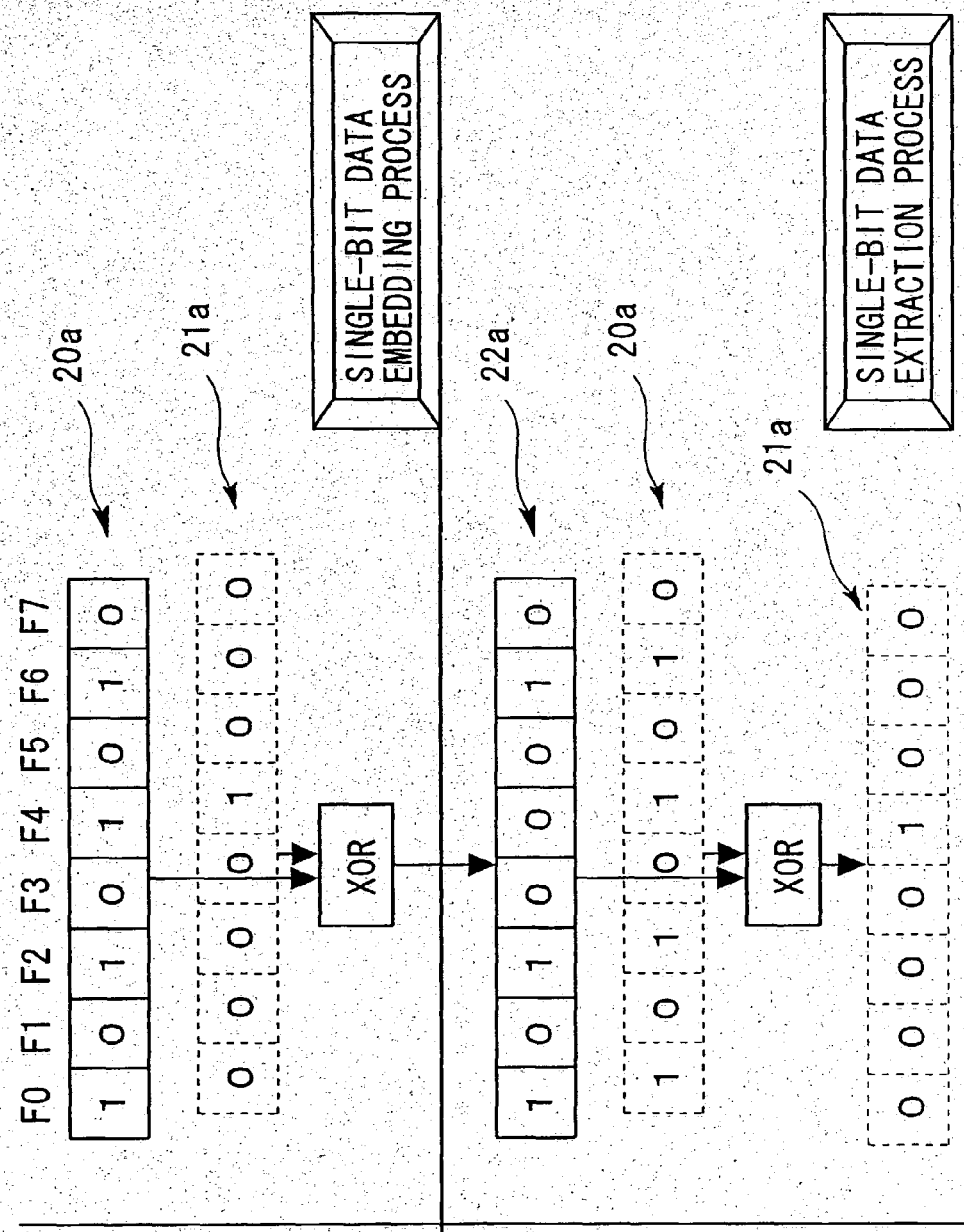
FIG. 1 is a diagram showing a single-bit data embedding process and, a single-bit data extraction process.

A data embedding device in this embodiment superposes embedded data on a rounding direction flag of a motion vector (which will hereinafter simply be called a [rounding direction flag] contained in coded dynamic image data. The discussion will start with touching on the rounding direction flag as a principle of the operation in this embodiment.

<Rounding Direction Flag>

The rounding direction flag is, as defined in ISO/IEC (International Organization for Standardization/International Electrotechnical Commission) MPEG-4 (Moving Pictures Experts Group Phase4) and ITU-T (International Telecommunication Union-Telecommunication Standardization Sector) H.263 Version.2, adopted in a low-bit rate dynamic image coding method. According to MPEG-4, 1-bit data known as vop_rounding_type existing in a VOP (Visual Object Plane) header is the rounding direction flag. Further, according to H.263 Version.2, 1-bit data termed RTYPE is the rounding direction flag.

According to both of MPEG-4 and H.263 Version.2, an inter-frame prediction coding method is carried out. Therefore, MPEG-4 and H.263 Version.2 have a scheme to improve a motion prediction efficiency by introducing a half-pel (pixel) accuracy motion vector into the motion prediction. Formulas 1 through 3 are expressions for inducing motion prediction images f(x, y) by use of motion vectors (Vx, Vy) and reference images g(x, y). The formulas 1 through 3 are, however, the expressions in a case where Vx, Vy, Vx and Vy are respectively half-pel accuracies.

$$f(x, y)=(g(x+Vx,y+Vy)+g(x+Vx+1, y+Vy))/2 \quad \text{[Formula 1]}$$

$$f(x, y)=(g(x+Vx,y+Vy)+g(x+Vx, y+Vy+1))/2 \quad \text{[Formula 2]}$$

$$f(x, y)=(g(x+Vx,y+Vy)+g(x+Vx+1, y+Vy))+g(x+Vx, y+Vy+1)+g(x+Vx+1, y+Vy+1))/4 \quad \text{[Formula 3]}$$

A rounding method of a calculation result into an integer value is defined in the division in each of the formulas 1 through 3. Specifically, the calculation result is rounded off in a positive infinity direction. The calculation result is thus rounded off, resulting in an occurrence of error. This error, i.e., a rounding error, is accumulated per frame. Therefore, in the continuous frames, the rounding errors are accumulated as a frame position becomes posterior. Accordingly, as the accumulated errors increase, there occur such visual deterioration that an entire picture assumes reddish.

According to MPEG-4 and H.263, the rounding direction flag is introduced for preventing this visual deterioration. The rounding direction flag is 1-bit data given per forward prediction frame. The rounding direction flag is data for preventing the rounding errors from being accumulated in the half-pel accuracy motion directional vectors. In the case of using the rounding direction flag, a motion compensation by the half-pel accuracy motion vector is expressed in each of formulas 4 through 6. The formulas 4 through 6 are expressions for inducing motion prediction images f(x, y) by use of the motion vectors (Vx, Vy), the reference images g(x, y) and a rounding direction flag rounding (0/1) The formulas 4 through 6 are, however, the expressions in the case where Vx, Vy, ,Vx and Vy are respectively the half-pel accuracies.

$$f(x, y)=(g(x+Vx, y+Vy)+g(x+Vx+1, y+Vy))+1-rounding)/2 \quad \text{[Formula 4]}$$

$$f(x, y)=(g(x+Vx, y+Vy)+g(x+Vx, y+Vy+1))+1-rounding)/2 \quad \text{[Formula 5]}$$

$$f(x, y)=(g(x+Vx, y+Vy)+g(x+Vx+1, y+Vy))+g(x+Vx, y+Vy+1)+g(x+Vx+1, y+Vy+1)+2-rounding)/4 \quad \text{[Formula 6]}$$

A value of the rounding direction flag is switched over, whereby the rounding direction is switched over to the positive infinity or the negative infinity. A rounding direction flag value "0" or "1" occurs each at a probability of 50% per frame, thereby offsetting influences of the rounding errors each other. A deterioration in a decoded image is thus prevented (avoided).

The data embedding device in this embodiment embeds the 1-bit data per frame in a way that changes this rounding direction flag value. At this time, the rounding direction flag is originally the 1-bit data per frame, and hence a total data size does not change at all before and after embedding the data. Namely, the embedding data is embedded by 1 bit for the 1-bit rounding direction flag. The value of the rounding direction flag is, however, changed from the original value, and hence there might be a possibility where the image deterioration occurs. To be more specific, the value of the rounding direction flag originally has 0 or 1 at the probability of 50%, however, the value of the rounding direction flag is changed due to the data embedding with the result that the flag value has either 0 or 1 occurred as a bias, and there is might be a possibility that the accumulated errors increase.

The bias in the rounding direction flag value can be prevented by setting to 1:1 an occurrence distribution of 0, 1 as the rounding direction flag values after embedding the data, and the image deterioration in the whole sequence can be also prevented. In this case, the rounding error flag value is changed from an actual value, and therefore an error occurs more or less depending on the pixels. The image deterioration in the whole sequence is, however, prevented. For example, if all the rounding flags for all the frames are inverted in 300-frame coding dynamic images (all the flags are inverted, and hence the occurrence distribution of 0, 1 as the rounding direction flag values is 1:1), an error accumulation per pixel is on the order of 10 at the maximum, wherein the visual deterioration is not perceived. Namely, even when the rounding direction flag value is rewritten from the original value, the occurrence distribution of 0, 1 as the rounding direction flag values is kept to 1:1, thereby making it possible to prevent the visual image deterioration.

According to the dynamic image coding method as adopted in MPEG-4 and H.263, an intra-frame coding algorithm (intra coding algorithm) is executed periodically (for instance, at an interval of 256 frames) in order to obviate mismatching in a DCT (Discrete cosine Transform) arithmetic accuracy. The intra-frame coding algorithm is a technique of coding from only the intra-frame information. Therefore, the rounding error does not occur in the intra-frame coding algorithm. Accordingly, the rounding error accumulation is reset by executing the intra-frame coding algorithm.

For the reason elucidated above, the occurrence distribution of 0, 1 as the rounding direction flag values is kept to 1:1, whereby the visual image deterioration can be prevented to such an extent that no practical problem may arise.

Given next is an explanation of the principle of the process in which the data embedding device in this embodiment superposes the embedding data on the rounding direction flag. The data embedding device in this embodiment executes any one of a single-bit data embedding process and a multi-bit data embedding process, thereby superposing the embedding data on the rounding direction flag. The embedding data embedded by the single-bit data embedding process is extracted by a single-bit data extraction process. Further, the embedding data embedded by the multi-bit data embedding process is extracted by a multi-bit data extraction process.

<Single-Bit Data Embedding Process/Single-Bit Data Extraction Process>

The single-bit data embedding process deals with independently each bit of the embedding data and is therefore called the single-bit data embedding process. Accordingly, the single-bit data embedding process is not limited to the process of embedding a single bit (1 bit) into one piece of coded dynamic image data. Namely, the embedding data consisting of a plurality of bits may also be embedded into one piece of coded dynamic image data by the single-bit data embedding process.

FIG. 1 is a diagram showing the principles of the single-bit data embedding process and of the single-bit data extraction process. The principles of the single-bit data embedding process and the single-bit data extraction process will be described referring to FIG. 1.

The principle of the single-bit data embedding process is shown in an upper part in FIG. 1. Further, F0 through F7 indicate frame numbers. To be specific, values shown under F0 through F7 indicate values of the rounding direction flags in respective frames. According to the single-bit data embedding process, the data embedding device calculates an exclusive OR (XOR) of a rounding direction flag 20a per frame in the original coded dynamic data and embedding data 21a, and embeds the embedding data 21a into the coded dynamic image data, thereby generating embedded coded dynamic image data 22a. At this time, a pattern of the rounding direction flag 20a is one of a plurality of predefined bit patterns, and the data extraction device is notified of which bit pattern is selected as embedding auxiliary information.

The principle of the single-bit data extraction process is shown in a lower part in FIG. 1. To begin with, the data extraction device is notified of the rounding direction flag 20a as the embedding auxiliary information. Then, the data extraction device calculates an exclusive OR of the data-embedded coded dynamic image data 22a and the rounding direction flag 20a, and extracts the embedding data 21a.

A premise of the single-bit data embedding process is that the embedding data have a small number of bits each having the value "1". Namely, the premise is that the values of the majority of bits of the embedding data are "0".

The single-bit data embedding and extraction processes described above are utilized for assigning, for example, a scene (defined as an aggregation of objects) cut head flag to a scene cut head frame. At this time, the majority of rounding direction flags are not changed, and therefore the distribution of the rounding direction flags remains substantially unchanged. Accordingly, the visual image deterioration does not occur.

<Multi-Bit Data Embedding Process/Multi-Bit Data Extraction Process>

Figure 2:
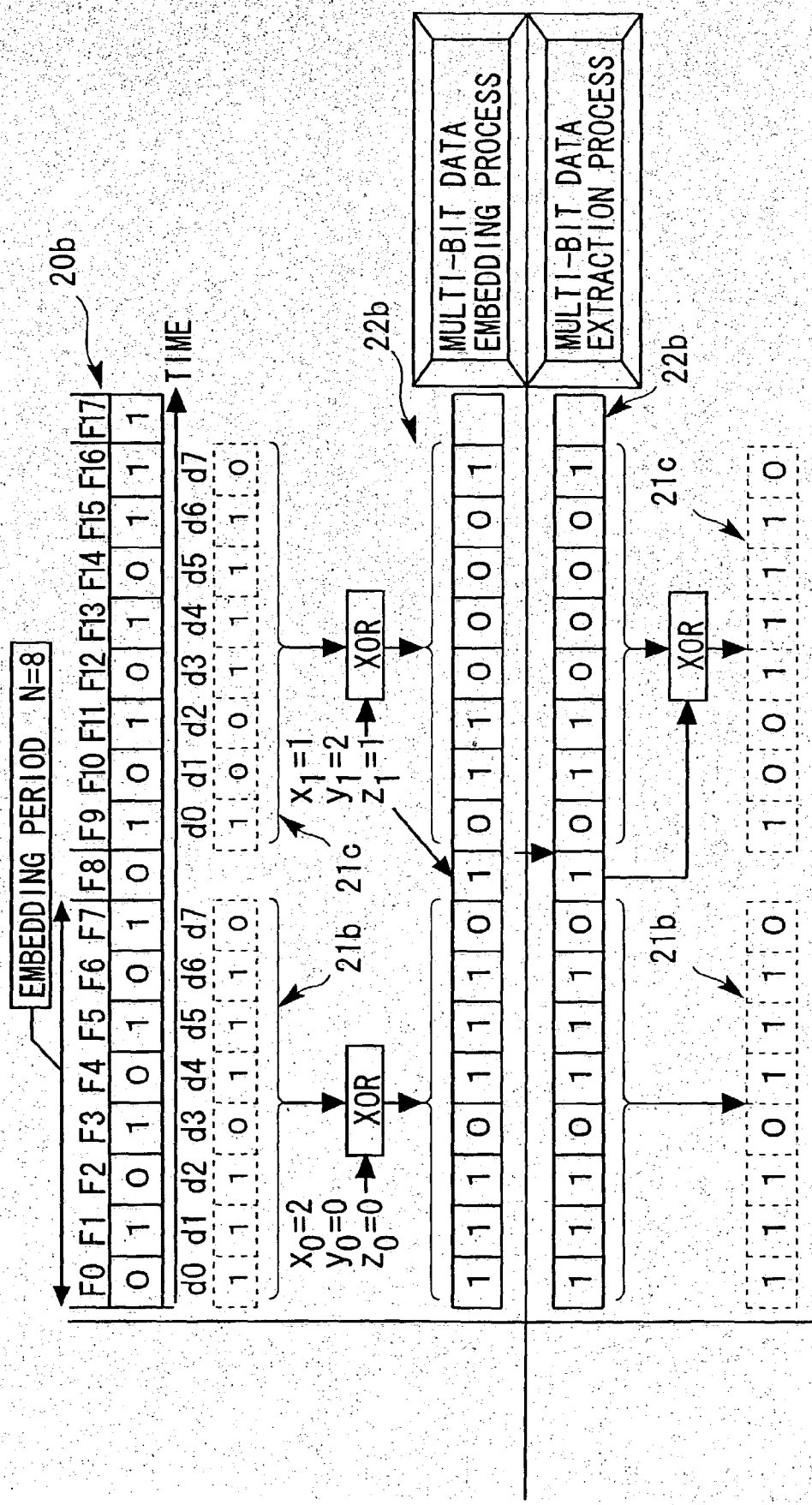
FIG. 2 is a diagram showing a multi-bit data embedding process and a multi-bit data extraction process.

FIG. 2 is a diagram showing the principles of the multi-bit data embedding process and of the multi-bit data extraction process. The principles of the multi-bit data embedding process and of the multi-bit data extraction process will be explained referring to FIG. 2.

The principle of the multi-bit data embedding process is shown in an upper part in FIG. 2. According to the multi-bit data embedding process, the embedding data is sectioned into embedding periods N and thus used. FIG. 2 shows an example in a case where the embedding period N=8. Therefore, referring again to FIG. 2, the embedding data is sectioned into pieces of embedding unit data 21b, 21c, ... on an 8-bit basis. The symbols d0 through d7 represent the 0th bit through the 7th bit of the embedding unit data. Further, F0 through F17 designate frame numbers. According to the multi-bit data embedding process, the data embedding device embeds the embedding data units 21b and 21c into the rounding direction flag 20b, thereby generating the embedded coded dynamic image data 22b.

In the multi-bit data embedding process, a value of invert flag $z_n$ is calculated per n-th (n=0, 1, 2, ...) embedding unit data from the head, and the embedding unit data is embedded into the rounding direction flag 20b of an ((N+1)n+N−1) th frame from an (N+1) n-th frame in accordance with a value of the invert flag $z_n$. Specifically, when the value of invert flag $z_n$ is 0, the n-th embedding unit data is directly (in an as-is state of the calculation result of the exclusive OR with 0 of N bits) replaced with values of a relevant section (corresponding to F0 through F7 when n=0 in the case of, e.g., the embedding unit data 21b) of the rounding direction flag. On the other hand, when the value of invert flag $z_n$ is 1, all the bits of the n-th embedding unit data are inverted (which is the calculation result of the exclusive OR with 1 of N bits) and then replaced with values of a relevant section (corresponding to F9 through F16 when n=1 in the case of; e.g., the embedding unit data 21c) of the rounding direction flag. Next, a method of calculating the value of the invert flag $z_n$ will be discussed.

The invert flag $z_n$ is calculated per embedding unit data. The invert flag $z_n$ in the n-th embedding unit data from the head is calculated by use of an input biased degree $x_n$ in the same embedding unit data and a biased degree accumulation $Y_{n-1}$ in the embedding unit data anterior by one. In the case of sign $(x_n)*\text{sign}(y_n)>0$, the invert flag becomes $z_n=1$. While on the other hand, if other than the above case, the invert flag becomes $z_n=0$. The formula 7 is an expression for obtaining the input bias $x_n$. The formula 8 is an expression for obtaining a biased degree accumulation $y_n$.

$$x_n = \left(\sum_{i=0}^{N-1} di\right) - (N/2) \quad \text{[Formula 7]}$$

$$y_n = y_{n-1} + z'_{n-1} x_{n-1} \quad \text{[Formula 8]}$$

The input biased degree $x_n$ represents how much the number of bits "1" is biased from an average (N/2) with respect to the processing target embedding unit data. If the input biased degree $x_n$ is 0, the number of bits "1" is equal to the number of bits "0" in the processing target embedding unit data, and hence, even if all the rounding flags of the original coded dynamic image are overwritten, the occurrence frequency of "0" and "1" becomes 1:1. Accordingly, if the input biased degree $x_n$ is 0, an even if all the rounding flags of the original coded dynamic image are overwritten, there is statistically no possibility in which a quality of the reproduced dynamic image greatly declines. Further, if the value of the input biased degree $x_n$ is positive, the occurrence frequency of "1" is larger than the average. By contrast, if the value of the input biased degree $x_n$ is negative, the occurrence frequency of "1" is smaller than the average. In this case, it is required that the value of the input biased degree $x_n$ be approximate to 0.

The biased degree accumulation $y_n$ is calculated by use of the biased degree accumulation $y_{n-1}$ and the input biased degree $x_{n-1}$. The condition is, however, that $y_o=0$. Namely, the biased degree accumulation $y_n$ (n=0) in the head embedding unit data is 0. In the formula 8, $z'_{n-1}$ is a value determined depending on $z_{n-1}$. If $z_{n-1}=1$, it follows that $z'_{n-1}=1$. If $z_{n-1}=0$, it follows that $z'_{n-1}=-1$. Thus, the value of the rounding direction flag of the ((N+1)n+N−1)th from the (N+1) n-th frame of the embedded coded dynamic image data 22b, is generated.

Further, the value of the invert flag $z_n$, which categorized as a piece of discrimination information, is embedded as the rounding direction flag of the ((N+1)n−1)th frame (n=1, 2 . . . ) of the embedded coded dynamic image data 22b. When n=0, it invariably follows that $z_0=0$, and hence there is no necessity of embedding. Thus, the embedded coded dynamic image data 22b is generated.

In the discussion made above, the value of the n-th biased degree accumulation $y_n$ is calculated in a way that holds the values of $x_{n-1}$, $y_{n-1}$ and $z_{n-1}$. A scheme may also, however, be taken, wherein the value of $y_{n+1}$ is calculated beforehand by use of the values of $x_n$, $y_n$ and $z_n$, and the calculated value of $y_{n+1}$ is held. In the case of previously calculating and holding the value of $y_{n+1}$, a size of the data that should be held is less than in the case of holding the values of $x_{n-1}$, $y_{n-1}$ and $z_{n-1}$. Therefore, saving of the memory can be actualized. Hence, this embodiment adopts the method of previously calculating and holding the value of $y_{n+1}$ by use of use of the values of $x_n$, $y_n$ and $z_n$.

The principle of the multi-bit data extraction process is shown in a lower part in FIG. 2. According to the multi-bit data extraction process, the data extraction device is previously notified of the value of the embedding period N as a piece of embedding auxiliary information. The data extraction device extracts a value of the rounding direction flag of the ((N+1)n+N−1)th frame from the (N+1)n-th frame (n=0, 1, 2 . . . ). Then, the data extraction device calculates an exclusive OR of a bit string of N-bit array of the value of the-rounding direction flag of the ((N+1)n−1)th frame (n=1, 2, . . . ) and the extracted value (the discrimination information) of the rounding direction flag. The calculated value is treated as the n-th embedding unit data. Namely, the data extraction device, if the value of the rounding direction flag of the ((N+1)n−1)th frame is 0, deals with the extracted value of the rounding direction flag directly as the n-th embedding unit data. By contrast, the data extraction device, if the value of the rounding direction flag of the ((N+1)n−1)th frame is 1, inverts all the extracted value of the rounding direction flag, and deals with the inverted result as the n-th embedding unit data.

When N=0, however, the value of the rounding direction flag of the (N−1)th frame from the 0th frame is dealt with directly as the embedding unit data. All pieces of the thus extracted embedding unit data are assembled into one bit string, thus restoring the embedding data.

[System Architecture]

Next, the data embedding device and the data extraction device in the embodiment of the present invention, will be described with reference to the drawings. Note that the explanation of this embodiment is an exemplification, and the architecture of the present invention is not limited to what will be hereinafter be described.

Figure 3:
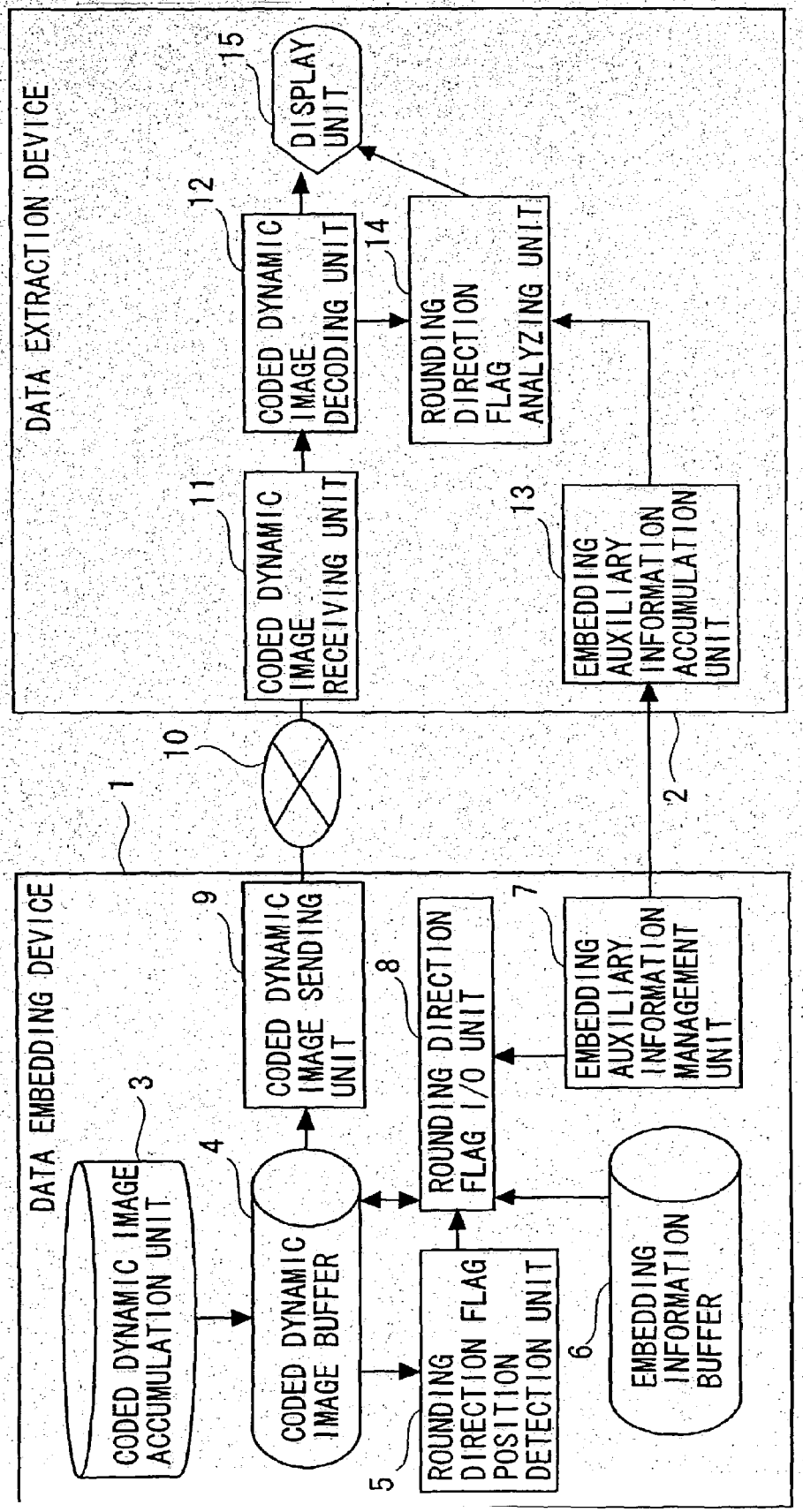
FIG. 3 is a diagram showing a data embedding device and a data extraction device in an embodiment of the present invention.

FIG. 3 is a block diagram showing a data embedding device 1 and a data extraction device 2 according to the present invention. Each of the data embedding device 1 and the data extraction device 2 includes, as hardware components, a CPU, a main memory (RAM), a sub-storage unit (hard disk), a communication control unit and so on, which are connected to each other via a bus. The data embedding device 1 and the data extraction device 2 are connected communicably with each other via a network 10.

In the data embedding device 1, an architecture for actualizing the single-bit data embedding process is different from an architecture for actualizing the multi-bit data embedding process. Therefore, the data embedding device 1 capable of processing only the single-bit data embedding process or the multi-bit data embedding process, can be configured. Further, the data embedding device 1 capable of processing both of the single-bit data embedding process and the multi-bit data embedding process, can be also configured.

Similarly in the data extraction device 2, an architecture for actualizing the single-bit data embedding process is different from an architecture for actualizing the multi-bit data embedding process. Therefore, the data extraction device 2 capable of processing only the single-bit data embedding process or the multi-bit data embedding process, can be configured. Further, the data extraction device 2 capable of processing both of the single-bit data embedding process and the multi-bit data embedding process, can be also configured. The architectures of the data embedding device 1 and of the data extraction device 2 are given respectively in the following discussion.

<Data Embedding Device>

The data embedding device 1, when a variety of programs (OS, application software, etc.) stored on a sub-storage device are loaded into the main memory and executed by the CPU, functions as a device including a coded dynamic image accumulation unit 3, a coded dynamic image buffer 4, a rounding direction flag position detection unit 5, an embedding information buffer 6, an embedding auxiliary information management unit 7, a rounding direction flag input/output (I/O) unit 8 and a coded dynamic image sending unit 9.

The coded dynamic image accumulation unit 3 is constructed of a nonvolatile storage device such as a hard disk, etc. The coded dynamic image accumulation unit 3 is (accumulated (stored) with normal coded dynamic image data into which no information is embedded, (which will hereinafter be called the [coded dynamic image data]). A method of generating the coded dynamic image data stored on the coded dynamic image accumulation unit 3 is not limited. Namely, the coded dynamic image data generated by use of whatever coding means are available. Further, the rounding direction flag in each frame of the coded dynamic image data stored on the coded dynamic image accumulation unit 3 is rewritten into one of the plurality of bit patterns managed by the embedding auxiliary information management unit 7.

The coded dynamic image buffer 4 (corresponding to a [dynamic image storage unit] according to the present invention) is constructed of a storage device such as a RAM, etc. The coded dynamic image buffer 4 temporarily stores (buffers) the coded dynamic image data as an embedding target into which the data embedding device 1 embeds the information.

The rounding direction flag position detection unit 5 is constructed of a CPU, a RAM and so on. The rounding direction flag position detection unit 5 analyzes the coded dynamic image data buffered on the rounding direction flag position detection unit 5, thereby detecting a position of the rounding direction flag contained in the same coded dynamic image data. Namely, the rounding direction flag position detection unit 5 outputs an offset value from a head bit of each frame of the coded dynamic image data to a bit indicating the rounding direction flag.

Moreover, the rounding direction flag position detection unit 5 detects and outputs GOPH (Group of Picture Header). The coded dynamic image data consist of one or more groups each structured of the continuous frames. At this time, GOPH is assigned to the frame positioned at the head of each group. Namely, the rounding direction flag position detection unit 5 detects GOPH, thereby detecting the head frame of each group.

Further, the rounding direction flag position detection unit 5 detects and outputs a frame number of the frame corresponding to the detected rounding direction flag. To be specific, the rounding direction flag position detection unit 5 detects the frame number and thus detects which position the frame of the group that corresponds to the detected rounding direction flag exists in.

The embedding information buffer 6 (corresponding to a [data storage unit] according to the present invention) is constructed of a storage device such as a PAM, etc. The embedding information buffer 6 temporarily stores (buffers) the data to be embedded (which will hereinafter referred to as [embedding data] into the coded dynamic image data.

The embedding auxiliary information management unit 7 (an auxiliary information management unit, an auxiliary information transmission unit) is constructed of a storage device such as a RAM a hard disk, etc. and of a communication device, etc. The embedding auxiliary information management unit 7 manages the embedding auxiliary information necessary for executing the data embedding process or the data extraction process.

When the data embedding device 1 is capable of executing the single-bit embedding process, the embedding auxiliary information management unit 7 stores a piece of information indicating which bit pattern the bit pattern of the bit string of the rounding direction flag in the coded dynamic image data stored on the coded dynamic image accumulation unit 3 is defined as.

Further, when the data embedding device 1 is capable of executing the multi-bit embedding process, the embedding auxiliary information management unit 7 stores a value of the embedding period necessary for the multi-bit extraction process.

Moreover, the embedding auxiliary information management unit 7 (the auxiliary information transmission unit) transmits the embedding auxiliary information to the information processing device fairly receiving the coded dynamic image data into which the data embedding device 1 embedded the embedding data. Herein, the embedding auxiliary information is the bit pattern of the rounding direction flag in the single-bit data embedding process, and is the value of the embedding period in the multi-bit data embedding process. The embedding auxiliary information management unit 7 transmits the embedding auxiliary information through a different system from the embedded coded dynamic image data. For instance, the embedding auxiliary information management unit 7 transmits the embedding auxiliary information to the data extraction device 2 by utilizing HTTP (HyperText Transfer Protocol) protocol, etc.

The rounding direction flag I/O unit 8 (corresponding to an [embedding unit] according to the present invention) is constructed of a CPU, a RAM and so on. The rounding direction flag I/O unit 8 embeds the embedding data into the coded dynamic image data buffered on the coded dynamic image buffer 4 by use of the rounding direction flag position, the frame number and the embedding auxiliary information. Details of the rounding direction flag I/O unit 8 will be described later on.

The coded dynamic image sending unit 9 (a transmission unit) is constructed of a communication device, etc. The coded dynamic image sending unit 9 transmits the embedded coded dynamic image data buffered on the coded dynamic image buffer 4 to the information processing device fairly receiving the same data via the network 10. Referring to FIG. 3, the information processing device fairly receiving the data is exemplified by an information extraction device 3. In this case, the information processing device fairly receiving the data maybe authenticated by utilizing whatever authentication technologies such as CHAP (Challenge Handshake Authentication Protocol), PAP (Password Authentication Protocol), etc. Further, the coded dynamic image sending unit 9 may transmit the embedded coded dynamic image data to one or more unspecified information processing devices via the network 10.

<<Rounding Direction Flag I/O Unit in Single-Bit Data Embedding Process>>

Figure 4:
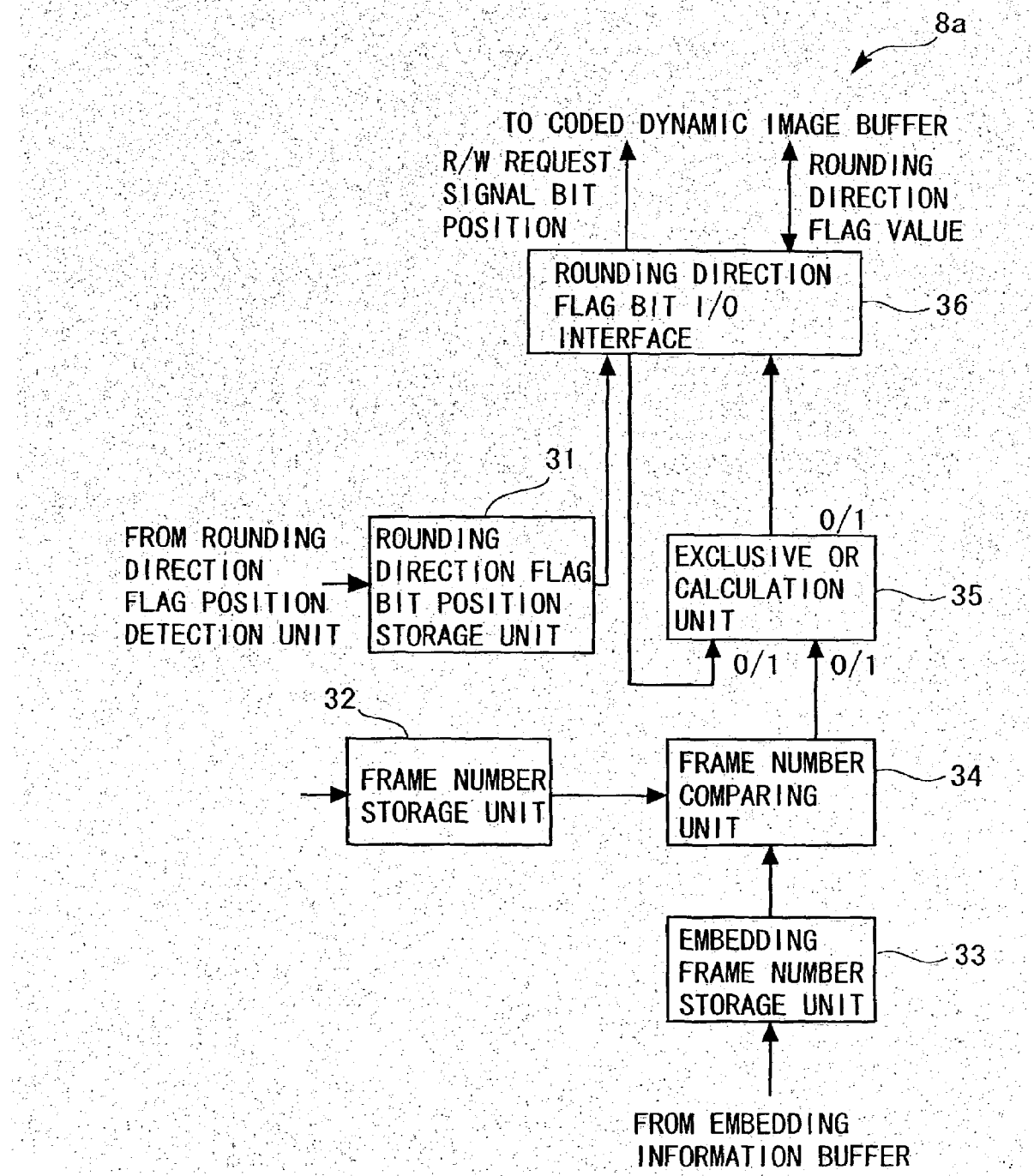
FIG. 4 is a diagram showing a rounding direction I/O unit for the single-bit data embedding process.

FIG. 4 is a block diagram showing the rounding direction I/O unit 8a for executing the single-bit data embedding process. The rounding direction I/O unit 8a for executing the single-bit data embedding process will be explained referring to FIG. 4.

The rounding direction I/O unit 8a includes a rounding direction flag bit position storage unit 31, a frame number storage unit 32, an embedding frame number storage unit 33, a frame number comparing unit 34, an exclusive OR calculation unit 35 and a rounding direction flag bit input/output (I/O) interface 36.

The rounding direction flag bit position storage unit 31 is constructed of a storage device such as a RAM, a register, etc. The bunding direction flag bit position storage unit 31 retains a bit position (that is an offset value from the head of data of each frame) of the rounding direction flag in the frame buffered on the coded dynamic image buffer 4. This offset value is outputted from the rounding direction flag position detection unit 5.

The frame number storage unit 32 (a frame number detection unit) is constructed of a storage device such as a RAM, a register, etc. The frame number storage unit 32 retains a frame number of the frame corresponding to the rounding direction flag position retained on the rounding direction flag bit position storage unit 31. The frame number is outputted from the rounding direction bit position detection device 5.

The embedding frame number storage unit 33 (a bit position detection unit) is constructed of a CPU, a RAM, etc. The embedding frame number storage unit 33 reads the embedding data stored on the embedding information buffer 6. Then, the embedding frame number storage unit 33 detects the offset value from the head of bits having "1" in the readout embedding data, and retains this offset value. This value is coincident with the frame number of the embedding target frame into which the embedding data is embedded.

The frame number comparing unit 34 (a judging unit) is constructed of a CPU, a RAM, etc. The frame number comparing unit 34 compares the frame number outputted from the frame number storage unit 32 with the frame number outputted from the embedding frame number storage unit 33. The frame number comparing unit 34 judges from a result of the comparison between the se two values whether the value of the embedding data corresponding to the rounding-direction flag contained in the frame number outputted from the frame number comparing unit 33, is 1 or not. The frame number comparing unit 34, if the two frame numbers compared are coincident with each other, outputs 1 to the exclusive OR calculation unit 35. The frame number comparing unit 34, whereas if the two frame numbers compared are not coincident, outputs 0 to the exclusive OR calculation unit 35.

Further, the frame number comparing unit 34 may output, only when the two frame numbers compared are coincident with each other, a control signal so as to operate the exclusive OR calculation unit 35.

The exclusive OR calculation unit 35 (corresponding to an [exclusive OR arithmetic unit] according to the present invention) is constructed of a CPU. The exclusive OR calculation unit 35 calculates an exclusive OR of the two inputs, and outputs a result of the calculation. A rounding direction flag value is inputted to one input of the exclusive OR calculation unit 35 from the rounding direction flag bit I/O interface 36. A value corresponding to the result of the comparison is inputted to the other input of the exclusive OR calculation unit 35 from the frame number comparing unit 34.

The rounding direction flag bit I/O interface 36 (corresponding to a [replacing unit] according to the present invention) is constructed of a CPU, a RAM, etc. The rounding direction flag bit I/O interface 36 reads a rounding direction flag existing in a designated bit position of the encoded dynamic image buffered on the coded dynamic image buffer 4. The bit position of the rounding direction flag is acquired from the rounding direction flag bit position storage unit 31. Then, the rounding direction flag bit I/O interface 36 outputs the bit value of the readout rounding direction flag to the exclusive OR calculation unit 35. Furthermore, the rounding direction flag bit I/O interface 36 writes a value inputted from the exclusive OR calculation unit 35, as a value of the rounding direction flag existing in the designated bit position of the coded dynamic image buffered on the coded dynamic image buffer 4.

<<Rounding Direction Flag I/O Unit for Multi-Bit Data Embedding Process>>

Figure 5:
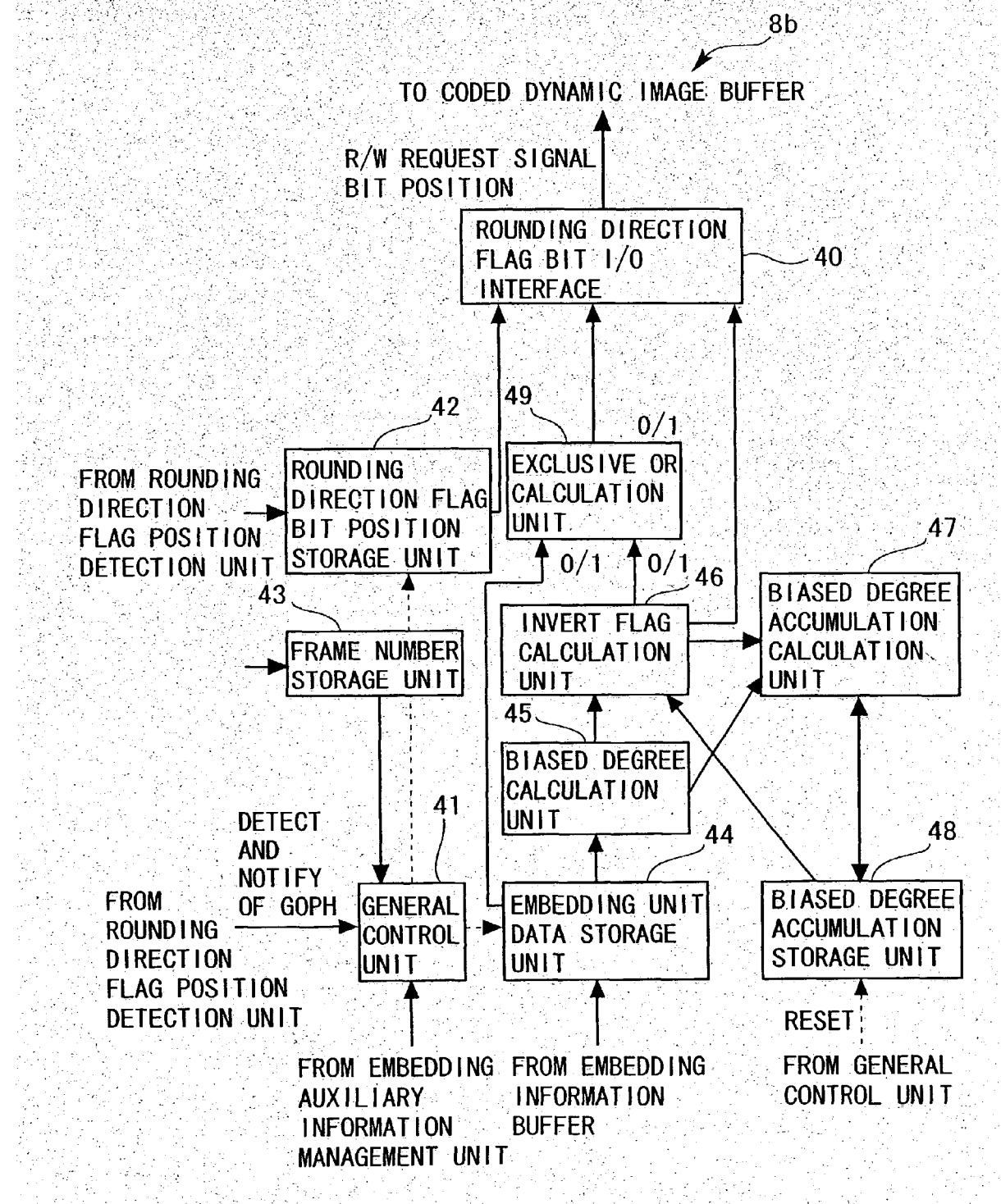
FIG. 5 is a diagram showing a rounding direction I/O unit for the multi-bit data embedding process.

FIG. 5 is a block diagram showing a rounding direction flag I/O unit 8b for executing the multi-bit data embedding process. Next, the rounding-direction flag I/O unit 8b for executing the multi-bit data embedding process, will be explained referring to FIG. 5.

The rounding direction flag I/O unit 8b includes a general control unit 41, a rounding direction flag bit position storage unit 42, a frame number storage unit 43, an embedding unit data storage unit 44, a biased degree calculation unit 45, an invert flag calculation unit 46, a biased degree accumulation calculation unit 47, a biased degree accumulation storage unit 48, an exclusive OR calculation unit 49 and a rounding direction flag bit I/O interface 40.

The general control unit 41 is constructed of a CPU, a RAM, etc. The general control unit 41 obtains an embedding period (an invert flag inserting interval) from the embedding auxiliary information management unit 7. Further, the general control unit 41 acquires a now-processable frame number from the frame number storage unit 43. Moreover, the general control unit 41 obtains a result of detection of GOPH from the rounding direction flag position detection unit 5. Further, the general control unit 41, when obtaining a GOPH detected notification, outputs a reset signal to the biased degree accumulation storage unit 48.

The rounding direction flag bit position storage unit 42 is constructed of a storage device such as a RAM, a register and so forth. The rounding direction flag bit position storage unit 42 retains a position of the rounding direction flag of each of the plurality of frames (the rounding direction flag bit position: the offset value from the head bit to the bit indicating the rounding direction flag). The rounding direction flag bit position is outputted from the rounding direction flag position detection unit 5.

The frame number storage unit 43 is constructed of a storage device such as a RAM, a register, etc. The frame number storage unit 43 retains a frame number corresponding to each of the plurality of rounding direction flag bit positions stored on the rounding direction flag bit position storage unit 42. This frame number is outputted from the rounding direction flag position detection unit 5 in synchronization with the rounding direction flag bit position corresponding thereto.

The embedding unit data storage unit 44 (corresponding to a [segmenting unit] according to the present invention) is constructed of a CPU, a RAM, etc. The embedding unit data storage unit 44 retains the embedding unit data that is embedded next. Namely, the embedding unit data storage unit 44 retains the processing target embedding unit data. The embedding unit data storage unit 44 reads the embedding unit data from the embedding information buffer 6 in accordance with the embedding period of which the general control unit 41 notifies.

The biased degree calculation unit 45 (a biased degree calculating unit) is constructed of a CPU, a RAM, etc. The biased degree calculation unit 45 calculates a biased degree in the embedding unit data outputted from the embedding unit data storage unit 44.

The invert flag calculation unit 46 (an invert flag judging unit) is constructed of a CPU, a RAM and so on. The invert flag calculation unit 46 calculates a value of the invert flag by use of an output from the biased degree calculation unit 45 and a value stored on the biased degree accumulation storage unit 48. The invert flag calculation unit 46 outputs the calculated value of the invert flag to the rounding direction flag bit I/O interface 40. Further, the invert flag calculation unit 46 outputs the calculated value of the invert flag to the exclusive OR calculation unit 49.

The biased degree accumulation calculation unit 47 (a biased degree accumulation calculating unit) is constructed of a CPU, a RAM and so forth. The biased degree accumulation calculation unit 47 calculates a biased degree accumulation by use of the value stored on the biased degree accumulation storage unit 48, and output from the invert flag calculation unit 46 and the output from the biased degree calculation unit 45. The biased degree accumulation calculation unit 47 writes (overwrites) the calculated value to the biased degree accumulation storage unit 48.

The biased degree accumulation storage unit 48(a biased degree accumulation storing unit) is constructed of a storage device such as a CPU, a RAM, etc. The biased degree accumulation storage unit 48 stores (saves) the output of the biased degree calculation unit 47. Further, the biased degree accumulation storage unit 48 outputs the self-stored biased degree accumulation to the invert flag calculation unit 46. Further, the biased degree accumulation storage unit 48, upon receiving the reset signal from the general control unit 41, initializes a self-stored value and stores "0".

The exclusive OR calculation unit 49 is constructed of a CPU. The exclusive OR calculation unit 49 calculates an exclusive OR of the output of the invert flag calculation unit 46 and the value (the embedding unit data) stored on the embedding unit data storage unit 44. The exclusive OR calculation unit 49 calculates an exclusive OR of each of all the bits of the embedding unit data stored on the rounding direction flag bit I/O interface 40 and the output of the invert flag calculation unit 46. Then, the exclusive OR calculation unit 49 outputs a result of the calculation of the exclusive OR to the rounding direction flag bit I/O interface 40.

The rounding direction flag bit I/O interface 40 (corresponding to a [replacing unit] according to the present invention) is constructed of a CPU, a RAM, etc. The rounding direction flag bit I/O interface 40 writes outputs from the exclusive OR calculation unit 49 and from the invert flag calculation unit 46 to a relevant bit of a concerned frame of the encoded dynamic image data stored on the encoded dynamic image buffer 4.

The rounding direction flag bit I/O interface 40 writes a value inputted from the exclusive OR calculation unit 49 or the invert flag calculation unit 46 to a bit position read from the rounding direction flag bit position storage unit 42 in the fame data having the frame number read from the frame number storage unit 43. The rounding direction flag, bit I/O interface 40 judges which value, the value inputted from the from the exclusive OR calculation unit 49 or the value inputted from the invert flag calculation unit 46, is written to the coded dynamic image data on the basis of the frame number read from the frame number storage unit 43. The rounding direction flag bit I/O interface 40 writes, if the frame number is within a range of (N+1)n-th through ((N+1)n+N−1)th frame numbers when the embedding period of which the general control unit 41 notifies is set to N and when the in-process embedding unit data is the n-th data, writes the value inputted from the exclusive OR calculation unit 49 to the coded dynamic image data. On the other hand, when the frame number is the ((N+1)n−1)th frame number, the rounding direction flag bit I/O interface 40 writes the value inputted from the invert flag calculation unit 46 to the coded dynamic image data.

<Data Extraction Device>

The data extraction device 2 will be described referring to FIG. 3. The data extraction device 2, when a variety of programs (OS, application software, etc.) stored on the sub-storage device are loaded into the main memory and executed by the CPU, functions as a device including a coded dynamic image receiving unit 11, a coded dynamic image decoding unit 12, an embedding auxiliary information accumulation unit 13, a rounding direction flag analysis unit 14 and a display unit 15.

The coded dynamic image receiving unit 11 is constructed of a communication device, etc. The coded dynamic image receiving unit 11 receives the embedded coded dynamic image data or the coded dynamic image data from the data embedding device 1 via the network 10.

The coded dynamic image decoding unit 12 is constructed of a CPU, a RAM, etc. The coded dynamic image decoding unit 12 decodes the embedded coded dynamic image data or the coded dynamic image data received by the coded dynamic image receiving unit 11. Further, the coded dynamic image decoding unit 12 also decodes, without being limited to the data received by the coded dynamic image receiving unit 11, the embedded coded dynamic image data or the coded dynamic image data written to, for instance, to a recording medium. Moreover, the coded dynamic image decoding unit 12 analyzes the embedded coded dynamic image data, thereby detecting the rounding direction flag per frame. Then, the coded dynamic image decoding unit 12 outputs the frame number and a value of the rounding direction flag of this frame to the rounding direction flag analysis unit 14.

The embedding auxiliary information accumulation unit 13 (corresponding to a [pattern storage unit] according to the present invention is constructed of a storage device such as a RAM, a hard disk, etc. and a communication device. The embedding auxiliary information accumulation unit 13 receives the embedding auxiliary information from the data embedding device 1 and stores the received information. The embedding auxiliary information accumulation unit 13 receives the embedding auxiliary information via a different system from the embedded coded dynamic image data. For example, the embedding auxiliary information accumulation unit 13 receives the embedding auxiliary information on the basis of HTTP protocol, etc.

Further, the embedding auxiliary information accumulation unit 13, if capable of executing the single-bit data extraction process, stores a bit pattern of the bit string of the rounding direction flag in the coded dynamic image data stored on the coded dynamic image accumulation unit 3. Then, the embedding auxiliary information accumulation unit 13 outputs the bit pattern specified by the received embedding auxiliary information to the rounding direction flag analyzing unit 14.

The rounding direction flag analyzing unit 14 is constructed of a CPU, a RAM, etc. The rounding direction flag analyzing unit 14 outputs the embedding data by use of the rounding direction flag per frame and the embedding auxiliary information. A process, i.e., a data extraction process in which the rounding direction flag analyzing unit 14 output the embedding data, will be explained in depth later on.

Figure 6:
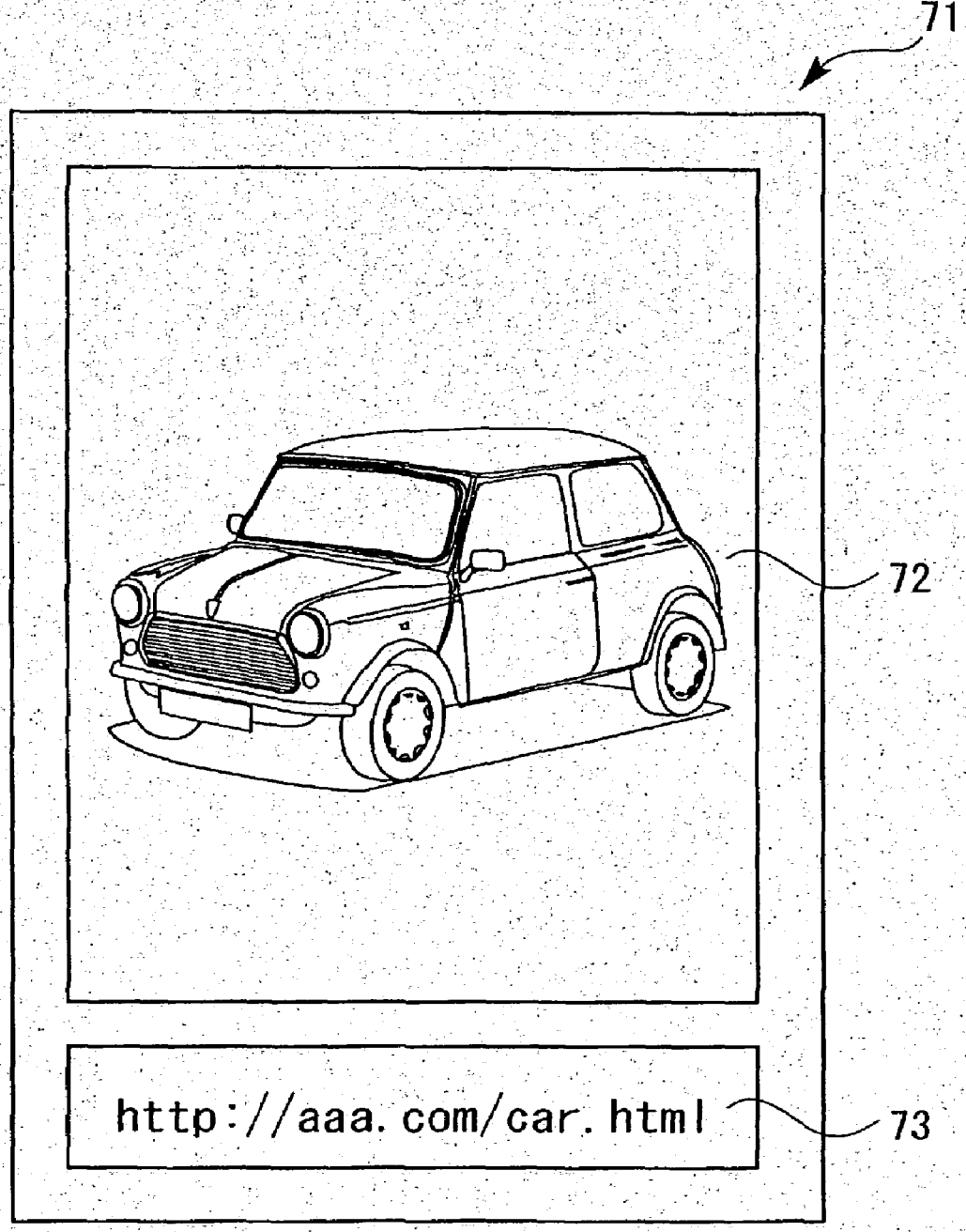
FIG. 6 is a view showing a display example on a display unit.

The display unit 15 is constructed of a CRP (Cathode Ray Tube), a liquid crystal display, etc. The display unit 15 displays a dynamic image decoded by the coded dynamic image decoding unit 12 and the embedding data outputted by the rounding direction flag analysis unit 14. FIG. 6 is a view showing a display example on the display unit 15. A user screen 71 shown to the user contains a dynamic image display area 72 and an embedding data display box 73. The user screen 71 has an HTML (HyperText Markup Language)—based layout. A dynamic image decoded by the coded dynamic image decoding unit 12 is displayed in the dynamic image display area 72. A content of the embedding data extracted by the rounding direction flag analysis unit 14 is displayed in the embedding data display box 73. In the example shown in FIG. 6, the embedding data is defined as a URL (Uniform Resource Locator) that specifies a content server by use of an HTML-based anchor tag set. In this case, when the URL displayed in the embedding data display box 73 is selected by an input device such as a mouse, etc., an HTML-described content specified by the URL is displayed on a different screen. This HTML content is, e.g., specifications of a car displayed in the dynamic image display area 72. Thus, the information of this HTML content supplements a substance of the content (car) displayed in the dynamic image display area 72.

<<Rounding Direction Flag Analysis Unit for Single-Bit Data Extraction Process>>

Figure 7:
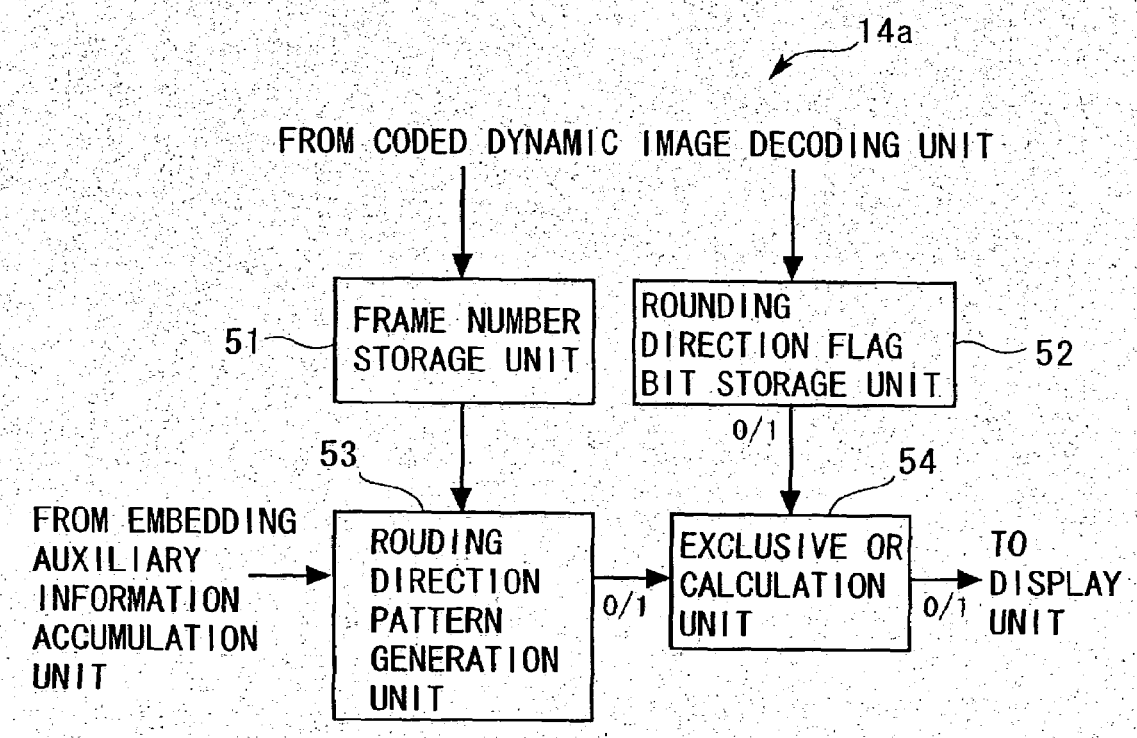
FIG. 7 is a diagram showing a rounding direction flag analyzing unit for the single-bit data extraction process.

FIG. 7 is a block diagram showing a rounding direction flag analysis unit 14a for executing the single-bit data extraction process. Next, the rounding direction flag analysis unit 14a for executing the single-bit data extraction process will be described referring to FIG. 7.

The rounding direction flag analysis unit 14a includes a frame number storage unit 51, a rounding direction flag bit storage unit 52, a rounding direction pattern generation unit 53 and an exclusive OR calculation unit 54.

The frame number storage unit 51 is constructed of a storage device such as a RAM, a register, etc. The frame number storage unit 51 retains a frame number of a frame decoded by the coded dynamic image decoding unit 12. This frame number is outputted by the coded dynamic image decoding unit 12.

The rounding direction flag bit storage unit 52 is constructed of a storage device such as a RAM, a register, etc. The rounding direction flag bit storage unit 52 retains a value of the rounding direction flag of the frame decoded by the coded dynamic image decoding unit 12.

The rounding direction pattern generation unit 53 is constructed of a CPU, a RAM, etc. The rounding direction pattern generation unit 53 obtains a bit value of a position of a value (frame number) stored on the frame number storage unit 51 in the bit pattern outputted from the embedding auxiliary information accumulation unit 13. Namely, the rounding direction pattern generation unit 53 obtains the value of the rounding direction flag of frame number given by the frame number storage unit 51 with respect to the original coded dynamic image. The rounding direction pattern generation unit 53 outputs the thus acquired rounding direction flag value to the exclusive OR calculation unit 54.

The exclusive OR calculation unit 54 is constructed of a CPU. The exclusive OR calculation unit 54 calculates an exclusive OR of a value stored on the rounding direction flag bit storage unit 52 and a value outputted from the rounding direction pattern generation unit 53. The exclusive OR calculation unit 54 outputs a result of the calculation, i.e., 0 or 1 to the display unit 15.

<<Rounding Direction Flag Analysis Unit for Multi-Bit Data Extraction Process>>

Figure 8:
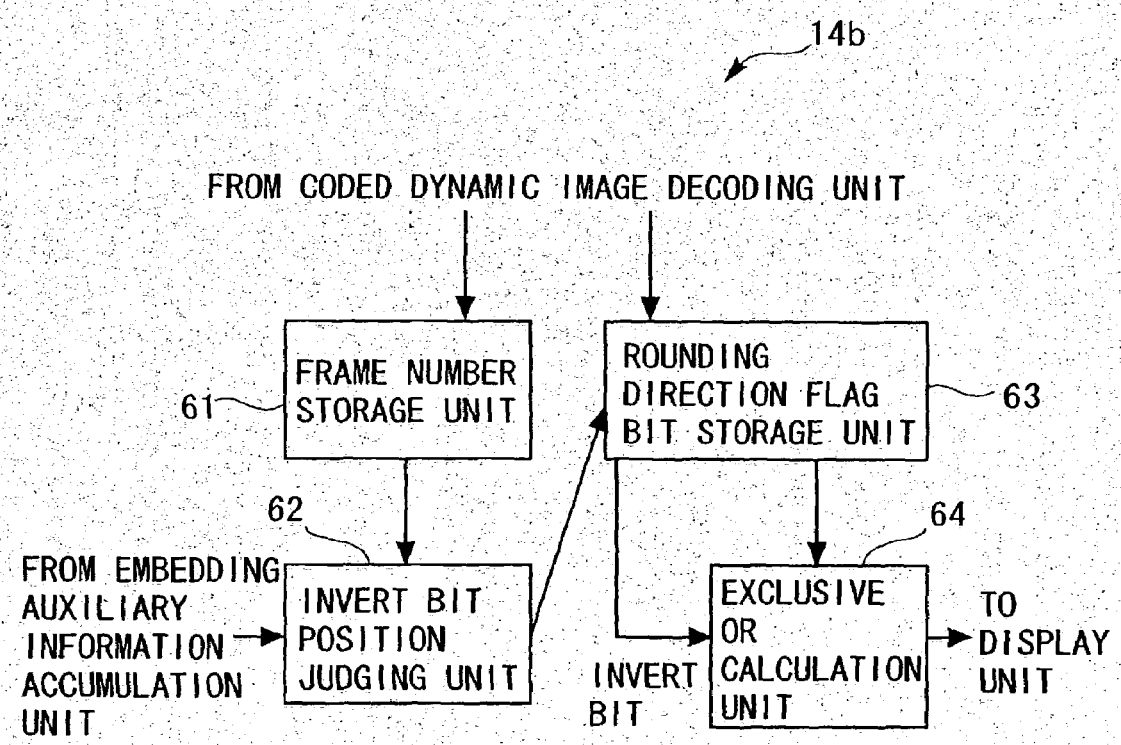
FIG. 8 is a diagram showing a rounding direction flag analyzing unit for the multi-bit data extraction process.

FIG. 8 is a block diagram showing a rounding direction flag analysis unit 14b for executing a multi-bit data extraction process. Next, the rounding direction flag analysis unit 14b for executing a multi-bit data extraction process will be explained referring to FIG. 8.

The rounding direction flag analysis unit 14b includes a frame number storage unit 61, an invert bit position judging unit 62, a rounding direction flag bit storage unit 63 and an exclusive OR calculation unit 64.

The frame number storage unit 61 is constructed of a storage device such as a RAM, a register, etc. The frame number storage unit 61 retains a frame number corresponding to each of bits of a bit string of the rounding direction flag stored on the rounding direction flag bit storage unit 63. The frame number is outputted from the coded dynamic image decoding unit 12 in synchronization with the bit value of the rounding direction flag corresponding thereto.

The invert bit position judging unit 62 is constructed of a CPU, a RAM, etc. The invert bit position judging unit 62 judges a frame number corresponding to an invert bit. The invert bit position judging unit 62 judges, based on the frame number outputted from the frame number storage unit 61 and the embedding auxiliary information (an embedding period) outputted from the embedding auxiliary information accumulation unit 13, whether the frame number stored on the frame number storage unit 61 is a frame number of the frame containing the invert bit as the rounding direction flag. The invert bit position judging unit 62 outputs a result of this judgement to the rounding direction flag bit storage unit 63.

The rounding direction flag bit storage unit 63 is constructed of a CPU, a RAM, etc. The rounding direction flag bit storage unit 63 retains the rounding direction flag. The rounding direction flag bit storage unit 63, when the invert bit position judging unit 62 notifies the rounding direction flag bit storage unit 63 that the self-retained rounding direction flag is an invert bit, outputs the self-retained rounding direction flag bit as an invert bit to the exclusive OR calculation unit 64. Further, the rounding direction flag bit storage unit 63 outputs a rounding direction flag other than the above flag to the exclusive OR calculation unit 64 as other input.

The exclusive OR calculation unit 64 (corresponding to an [invert judgement unit] and an [inverting unit] according to the present invention) is constructed of a CPU, a RAM, etc. The exclusive OR calculation unit 64, when receiving the invert bit from the rounding direction flag bit storage unit 63, stores an unillustrated self-possessed invert bit storage unit with the invert bit. The exclusive OR calculation unit 64 calculates an exclusive OR of the invert bit stored on the invert bit storage unit and a value of the rounding direction flag stored on the rounding direction flag bit storage unit. Namely, the exclusive OR calculation unit 64, if the invert bit is 1, judges that the value of the rounding direction flag should be inverted, and inverts and outputs the value of the rounding direction flag. The exclusive OR calculation unit 64 obtains, through this calculation, the embedded information, i.e., the embedding data. The exclusive OR calculation unit 64 outputs the obtained embedding data to the display unit 15.

[Operational Example]

Next, operational examples of the data embedding device 1 and of the data extraction device 2 in this embodiment, will be described. Note that the operational example of the data embedding device 1 will be explained in separation into the single-bit data embedding process and the multi-bit data embedding process. Further, the operational example of the data extraction device 2 will be explained in separation into the single-bit data extraction process and, the multi-bit data extraction process.

<Data Embedding Device>
<<Single-Bit Data Embedding Process>>

The operational example in a case where the data embedding device 1 in this embodiment executes the single-bit data embedding process, will be described referring to FIGS. 3 and 4. To start with, among pieces of coded dynamic image data stored on the coded dynamic image accumulation unit 3, a piece of embedding target coded dynamic image data into which the embedding data is embedded is written to the coded dynamic image buffer 4 per frame.

The rounding direction flag position detection unit 5 acquires a frame number of the frame buffered on the coded dynamic image buffer 4, i.e., the frame number of the processing target frame. Further, the rounding direction flag position detection unit 5 obtains an offset value to a bit indicating the round direction flag in the processing target frame. Then, the rounding direction flag position detection unit 5 outputs this offset value to the rounding direction flag bit position storage unit 31. Moreover, the rounding direction flag position detection unit 5 outputs this frame number to the frame number storage unit 32. The rounding direction flag bit position storage unit 31 is stored with this offset value. Furthermore, the frame number storage unit 32 is stored with this frame number.

The embedding data stored on the embedding information buffer 6 is read from the embedding frame number storage unit 33. At this time, the embedding frame number storage unit 33 retains the frame number of the embedding target frame into which the embedding data is embedded.

The frame number comparing unit 34 compares the frame number stored on the embedding frame number storage unit 33 with the frame number stored on the frame number storage unit 32, thereby judging whether the se two values are coincident with each other. The frame number comparing unit 34, if the se two values are coincident with each other, outputs "1" to the exclusive OR calculation unit 35. Whereas if not coincident with each other, the frame number comparing unit 34 outputs "0" to the exclusive OR calculation-unit 35.

The rounding direction flag bit I/O interface 36 reads the offset value from the rounding direction flag bit position storage unit 31. The rounding direction flag bit I/O interface 36 reads a value of the bit corresponding to the readout offset value from the coded dynamic image buffer 4, Then, the rounding direction flag bit I/O interface 36 outputs the readout bit value to the exclusive OR calculation unit 35.

The exclusive OR calculation unit 35 calculates an exclusive OR of the value inputted from the rounding direction flag bit I/O interface 36 and the value inputted from the frame number comparing unit 34. The exclusive or calculation unit 35 outputs a result of the calculation to the rounding direction flag bit I/O interface 36. Then, the rounding direction flag bit I/O interface 36 writes the value inputted from the exclusive OR calculation unit 35 to the bit corresponding to the offset value among the pieces of data stored in the coded dynamic image buffer 4. Thus, the embedding data is embedded into the coded dynamic image data, thereby generating the embedded coded dynamic image data.

The coded dynamic image sending unit 9 sends the embedded coded dynamic image data buffered on the coded dynamic image buffer 4 to the data extraction device 2 via the network 10. Further, the embedding auxiliary information management unit 7 transmits the embedding auxiliary information in the processing target coded dynamic image data to the data extraction device 2.

<<Multi-Bit Data Extraction Process>>

The operational example in a case where the data embedding device 1 in this embodiment executes the multi-bit data embedding process will be explained referring to FIGS. 3 and 5. To begin with, the embedding auxiliary information management unit 7 notifies the general control unit 41 of a value of the embedding period. Further, among pieces of coded dynamic image data stored on the coded dynamic image accumulation unit 3, the embedding target coded dynamic image data into which the embedding data is embedded is written to the coded dynamic image buffer 4 per frame.

The rounding direction flag position detection unit 5 acquires a frame number of the frame buffered on the coded dynamic image buffer 4, i.e., the frame number of the processing target frame. Further, the rounding direction flag position detection unit 5 judges whether or not the frame buffered on the coded dynamic image buffer 4 contains GOPH. The rounding direction flag position detection unit 5, upon detecting GOPH, notifies the general control unit 41 that GOPH has been detected. Moreover, the rounding direction flag position detection unit 5 obtains an offset value to a bit indicating the round direction flag in the processing target frame. Then, the rounding direction flag position detection unit 5 outputs this offset value to the rounding direction flag bit position storage unit 42. Moreover, the rounding direction flag position detection unit 5 outputs the frame number of this frame to the frame number storage unit 43. The rounding direction flag bit position storage unit 42 is stored with this offset value. Furthermore, the frame number storage unit 43 is stored with this frame number.

The embedding unit data storage unit 44, based on the embedding period value with its notification given from the general control unit 41, reads the embedding unit data from the embedding information buffer 6. Further, the embedding unit data storage unit 44 outputs the readout embedding unit data bitwise to the exclusive OR calculation unit 49.

The biased degree calculation unit 45 calculates a biased degree with respect to the embedding unit data stored on the embedding unit data storage unit 44. The biased degree calculation unit 45 outputs the calculated biased degree to the invert flag calculation unit 46 and the biased degree accumulation calculation unit 47.

The invert flag calculation unit 46 reads the biased degree accumulation stored on the biased degree accumulation storage unit 48. The invert flag calculation unit 46 calculates a value of the invert flag by use of the readout biased degree accumulation and the biased degree inputted from the biased degree calculation unit 45. The invert flag calculation unit 46 outputs the calculated invert flag value to the biased degree accumulation calculation unit 47, the rounding direction flag bit I/O interface 40 and the exclusive OR calculation unit 49.

The biased degree accumulation calculation unit 47 calculates a new biased degree accumulation by use of the invert flag value inputted from invert flag calculation unit 46, the biased degree inputted from the biased degree calculation unit 45 and the biased degree accumulation stored on the biased degree accumulation storage unit 48. Namely, the biased degree accumulation calculation unit 47 calculates the biased degree accumulation used in the embedding unit data that is to be read next from the embedding unit data storage unit 44. The biased degree accumulation calculation unit 47 writes the biased degree accumulation calculated afresh to the biased degree accumulation storage unit 48.

The exclusive OR calculation unit 49 calculates an exclusive OR of each of all bits inputted from the embedding unit data storage unit 44 and the invert flag value inputted from the invert flag calculation unit 46. Then, the exclusive OR calculation unit 49 outputs the calculated value to the rounding direction flag bit I/O interface 40.

The rounding direction flag bit I/O interface 40 writes the value inputted from the exclusive OR calculation unit 49 or the invert flag calculation unit 46 to the coded dynamic image data buffered on the coded dynamic image buffer 4. Thus, the embedding data is embedded into the coded dynamic image data, thereby generating the embedded coded dynamic image data.

The coded dynamic image sending unit 9 sends to the network 10 the embedded coded dynamic image data buffered on the coded dynamic image buffer 4. Further, the embedding auxiliary information management unit 7 transmits to the data extraction device 2 the embedding auxiliary information, i.e., the embedding period in the processing target coded dynamic image data.

<Data Extraction Device>
<<Single-Bit Data Extraction Process>>

An operational example in a case where the data extraction device 2 in this embodiment executes the single-bit data extraction process, will be discussed referring to FIGS. 3 and 7. The coded dynamic image receiving unit 11 receives the embedded coded dynamic image data from the data embedding device 1 via the network 10 and stores the same data. Moreover, the embedding auxiliary information accumulation unit 13 receives the embedding auxiliary information from the data embedding device 1. To be more specific, the embedding auxiliary information accumulation unit 13 receives from the data embedding device 1 the embedding auxiliary information showing which bit pattern the bit pattern of the rounding direction flag of the coded dynamic image data received by the coded dynamic image receiving unit 11 is defined as. The embedding auxiliary in formation accumulation unit 13 outputs this bit pattern to the rounding direction pattern,generation unit 53.

The coded dynamic image decoding unit 12 decodes the embedded coded dynamic image data stored on the coded dynamic image receiving unit 11, thereby generating a dynamic image. The coded dynamic image decoding unit 12 outputs the decoded and generated dynamic image to the display unit 15. Further, coded dynamic image decoding unit 12 synchronously outputs the frame number and the value of the rounding direction flag of the frame with this frame number to the frame number storage unit 51 and to the rounding direction flag bit storage unit 52.

The rounding direction pattern generation unit 53 acquires a value of the rounding direction flag by use of the frame number stored on the frame number storage unit 51 and the bit pattern inputted from the embedding auxiliary information accumulation unit 13. Then, the rounding direction pattern generation unit 53 outputs the rounding direction flag value, i.e., 0 or 1 to the exclusive OR calculation unit 54.

The exclusive OR calculation unit 54 calculates an exclusive OR of the value inputted from the rounding direction pattern generation unit 53 and the value stored on the rounding direction flag bit storage unit 52. Then, the exclusive OR calculation unit 54 outputs a result of the calculation as the embedding data to the display unit 15.

<<Multi-Bit Data Extraction Process>>

An operational example in a case where the data extraction device 2 in this embodiment executes the multi-bit data extraction process, will be discussed referring to FIGS. 3 and 8. The coded dynamic image receiving unit 11 receives the embedded coded dynamic image data from the data embedding device 1 via the network 10 and stores the same data. Moreover, the embedding auxiliary information accumulation unit 13 receives the embedding auxiliary information from the data embedding device 1. Further, the embedding auxiliary information accumulation unit 13 receives the embedding auxiliary information from the data embedding device 1. Namely, the embedding auxiliary information accumulation unit 13 receives the embedding period from the data embedding device 1. The embedding auxiliary information accumulation unit 13 outputs this embedding period to the invert bit position judging unit 62.

The coded dynamic image decoding unit 12 decodes the embedded coded dynamic image data stored on the coded dynamic image receiving unit 11, thereby generating a dynamic image. The coded dynamic image decoding unit 12 outputs the decoded and generated dynamic image to the display unit 15. Further, coded dynamic image decoding unit 12 synchronously outputs the frame number and the value of the rounding direction flag of the frame with this frame number to the frame number storage unit 61 and to the rounding direction flag bit storage unit 63.

The invert bit position judging unit 62 judges based on the embedding period inputted from the embedding auxiliary information accumulation unit 13 whether or not the frame having the frame number stored on the frame number storage unit 61 is a frame having a rounding direction flag that indicates the invert bit. Then, the invert bit position judging unit 62 outputs a result of this judgement to the rounding direction flag bit storage unit 63.

The rounding direction flag bit storage unit 63, when the invert bit position judging unit 62 notifies this storage unit 63 that the rounding direction flag inputted from the coded dynamic image decoding unit 12 is the invert bit, outputs this rounding direction flag as the invert bit to the exclusive OR calculation unit 64. Moreover, the rounding direction flag bit storage unit 63 outputs a rounding direction flag other than the above flag to the exclusive OR calculation unit 64 as other input.

The exclusive OR calculation unit 64 calculates an exclusive OR of the self-stored invert bit value and the rounding direction flag value inputted from the rounding direction flag bit storage unit 63. Then, the exclusive OR calculation unit 64 outputs a result of the calculation as the embedding data to the display unit 15.

[Operation]

In this embodiment, the data embedding device 1 capable of executing the single-bit data embedding process calculates the exclusive OR of the bit value of the rounding direction flag in each frame of the embedding target coded dynamic image data into which the data is embedded and the bit value of the embedding data, thereby embedding the embedding data into the coded dynamic image data. At this time, a data size of the embedding data is restricted down to an extremely small quantity. Therefore, the values of the rounding direction flags in the great majority of frames remain unchanged. Accordingly, the data can be embedded into the coded dynamic image data without causing any decline of the image quality.

Further, in this embodiment, the data embedding device 1 capable of executing the single-bit data embedding process embeds the embedding data in a way that makes it difficult to extract the embedded data unless the embedding auxiliary information (the bit pattern). This is because if the bit pattern is unknown, it is impossible to judge which rounding direction flag the embedding data is embedded into. Therefore, the user who is able to extract the embedded data can be selected by selecting whether to notify of the embedding auxiliary information or not.

In this embodiment, the data embedding device 1 capable of executing the multi-bit data embedding process replaces the rounding direction flag in each frame of the data embedding target coded dynamic image data with the embedding data, and further periodically (with the embedding period) embeds the invert bit, thus embedding the 1-bit data per frame. Hence, the information such as the URL having several through several,tens of bytes can be embedded into the coded dynamic image data.

Moreover, in this embodiment, the data embedding device 1 capable of executing the multi-bit data embedding process embeds the embedding data in a way that makes it difficult to extract the embedded data unless the embedding auxiliary information (the embedding period). This is because if the embedding period is unknown, it is impossible to recognize which rounding direction flag indicates the invert bit. Therefore, the user who is able to extract the embedded data can be selected by selecting whether to notify of the embedding auxiliary information or not.

Moreover, in this embodiment, according to the data embedding device 1 capable of executing the multi-bit data embedding process, all the bits of the embedding unit data are embedded in the as is-state or in the inverted state into the coded dynamic image data in accordance with the value of the biased degree accumulation and the value of the biased degree. Therefore, the occurrence frequency of "0" and "1" takes a ratio approximate to 1:1 in the sequence as a whole. Accordingly, the decline of the image quality is prevented in the whole sequence.

Moreover, according to the data embedding device 1 capable of executing the single-bit data embedding process and/or the multi-bit data embedding process in this embodiment, the 1- or more-bit embedding data is not embedded into 1 bit of the rounding direction flag of the coded dynamic image data. Therefore, the data size of the coded dynamic image remains unchanged, and the embedding data is embedded into the coded dynamic image data. Accordingly, the coded dynamic image data can be packetized by utilizing a hint track, and a load as a burden upon the device when packetizing the data is reduced. Moreover, a model of VBV (Virtual Buffer Verifier) defined in MPEG 1, 2, 4 is prevented from ending in a failure due to an increase and a decrease in the data size.

[Modified Example]

The exclusive OR calculation unit 35, only when receiving the controls signal from the frame number comparing unit 34, may calculates the exclusive OR of the two values inputted. In this case, the exclusive OR calculation unit 35, when it does not receive the control signal, outputs the value inputted from the rounding direction flag bit I/O interface 36 directly back to the rounding direction flag bit I/O interface 36.

Further, the rounding direction flag I/O unit 8a for the single-bit data embedding process may include an illustrated invert bit calculation unit (an inverting unit) as a substitute for the exclusive OR calculation unit 35. In this case, when receiving 0 as the control signal from the frame number comparing unit 34, the invert bit calculation unit outputs the value inputted from the rounding direction flag bit I/O interface 36 directly back to the rounding direction flag bit I/O interface 36. On the other hand, when receiving 1 as the control signal from the frame number comparing unit 34, the invert bit calculation unit inverts the value inputted from the rounding direction flag bit I/O interface 36 and thus outputs the inverted value to the rounding direction flag bit I/O interface 36.

Further, the embedding auxiliary information accumulation unit 13 in this embodiment may be stored with not the bit pattern itself but bit pattern information for specifying the bit pattern, the bit pattern information is data, etc. that specifies the bit pattern with, e.g., a run length.

Although only a few embodiments of the present invention have been described in detail above, those skilled in the art will readily appreciate that many modifications are possible in the preferred embodiments without departing from the novel teachings and advantages of this invention. Accordingly, all such modifications are intended to be included within the scope of the present invention as defined by the following claims.

What is claimed is:

1. A data embedding device comprising:
a dynamic image storage unit storing inter-frame prediction coded dynamic image data;
an embedding data storage unit storing embedding data that is embedded into the inter-frame prediction coded dynamic image data; and
an embedding unit embedding by superposing the embedding data into a rounding direction flag contained per frame data in the inter-frame prediction coded dynamic image data,
wherein the superposing is performed by replacing the rounding direction flag with a new rounding direction flag, based upon a logical calculation of a value of the rounding direction flag and a value of the embedding data.

2. A data embedding device according to claim 1, wherein said embedding unit includes:
an exclusive OR calculating unit as the logical calculation calculating an exclusive OR of the value of the rounding direction flag and the value of the embedding data; and
a replacing unit replacing the rounding direction flag value defined as a value contained in the inter-frame prediction coded dynamic image data and used as an input of said exclusive OR calculating unit, with a value of a result of the calculation by said exclusive OR calculating unit as the new rounding direction flag.

3. A data embedding device according to claim 2, wherein said embedding unit further includes a detecting unit detecting a rounding direction flag having "1" as a corresponding embedding data value among the rounding direction flags corresponding to respective bits structuring the embedding data, and
said exclusive OR calculating unit performs the exclusive OR calculation with respect only the rounding direction flag detected by said detecting unit.

4. A data embedding device according to claim 1, wherein said embedding unit includes:
a detecting unit detecting a rounding direction flag having "1" as a corresponding embedding data value among the rounding direction flags corresponding to respective bits structuring the embedding data; and
an inverting unit as the logical calculation inverting a value of the rounding direction flag detected by said detecting unit.

5. A data embedding device according to claim 3 or 4, wherein said detecting unit includes:
a bit position detecting unit detecting an offset value of a bit of which a value is "1" from a head bit of the embedding data;

a frame number detecting unit detecting a frame number of an embedding target frame into which the embedding data is embedded, in the inter-frame prediction coded dynamic image data; and a judging unit judging, if the offset value and the frame number are coincident with each other, that the rounding direction flag contained in the target frame is the rounding direction flag with "1" as a corresponding embedding data value.

6. A data embedding device according to claim 1, further comprising an auxiliary information managing unit managing auxiliary information indicating which bit pattern of one or more bit patterns a pattern specified by the value of the rounding direction flag in the continuous frames is defined as, or indicating which bit pattern a bit pattern of a value of the rounding direction flag in the inter-frame prediction coded dynamic image data serving as a processing target by said embedding unit is defined as.

7. A data embedding device according to claim 6, further comprising:
a transmitting unit transmitting to other device the data outputted from said embedding unit; and
an auxiliary information transmitting unit transmitting the auxiliary information to other device by utilizing a method different from that of said transmitting unit.

8. A data embedding device according to claim 1, wherein said embedding unit further includes:
a segmenting unit segmenting the embedding data into plural pieces of sub embedding data;
an invert judging unit judging whether the sub embedding data should be inverted so as to uniformize a 1-and-0 distribution in the rounding direction flags contained in the inter-frame prediction coded dynamic image data;
an inverting unit inverting the relevant sub embedding data on the basis of the judgment by said invert judging unit; and
a replacing unit replacing the sub embedding data inverted or not inverted by said inverting unit with the rounding direction flag of the continuous frames of which the number is the same as a bit number of this sub embedding data.

9. A data embedding device according to claim 8, wherein said replacing unit further replaces an invert flag indicating whether the processing target sub embedding data is the inverted data or not, with the rounding direction flag in the continuous frames of which the number is the same as the bit number of this invert flag, this rounding direction flag not being inverted with the sub embedding data.

10. A data embedding device according to claim 9, wherein said segmenting unit segments the embedding data into the sub embedding data having a predetermined bit number.

11. A data embedding device according to claim 10, wherein said replacing unit as the new rounding direction flag replaces the rounding direction flag in the frame continuous with the frame containing the rounding direction flag replaced with the sub embedding data segmented by the predetermined bit number, with the invert flag.

12. A data embedding device according to claim 10 or 11, further comprising:
a transmitting unit transmitting to other device the data outputted from said embedding unit; and
an auxiliary information transmitting unit transmitting auxiliary information indicating the predetermined bit number to other device by utilizing a method different from that of said transmitting unit.

13. A data embedding device according to claim 12, wherein said invert judging unit includes:
a biased degree calculating unit calculating a biased degree in the sub embedding data by subtracting a value obtained by dividing a value of the bit number by "2" from a total value of respective bit values of the sub embedding data;
a biased degree accumulation storing unit storing a biased degree accumulation value necessary for embedding the data; and
an invert flag judging unit judging whether the sub embedding data should be inverted or not by comparing the biased degree in the processing target sub embedding data with the biased degree accumulation value.

14. A data embedding device according to claim 13, wherein said invert judging unit further includes a biased degree accumulation calculating unit calculating a biased degree accumulation value in the next sub embedding data by adding a biased degree accumulation value in the processing target sub embedding data of the continuous sub embedding data, a value, corresponding to a result of the judgement by said invert flag judging unit, in the processing target sub embedding data, and a multiplied value of the biased degree.

15. A data extraction device comprising:
a storing unit storing inter-frame prediction coded dynamic image data with embedding data embedded into a rounding direction flag by superposing; and
an extracting unit extracting the superposed embedding data from a new rounding direction flag of the inter-frame prediction coded dynamic image data by use of data for extraction,
wherein the superposing is performed by replacing the rounding direction flag with the new rounding direction flag, based upon a logical calculation of a value of the rounding direction flag and a value of the embedding data.

16. A data extraction device comprising:
a dynamic image storing unit storing inter-frame prediction coded dynamic image data with embedding data embedded into a rounding direction flag by superposing;
a pattern storing unit storing bit pattern information for specifying a bit pattern of the rounding direction flag in continuous frames of the inter-frame prediction coded dynamic image data before the superposed embedding data has been embedded; and
a calculating unit calculating an exclusive OR of the bit pattern specified by the bit pattern information and a value of a new rounding direction flag of the inter-frame prediction coded dynamic image data for extracting the superposed embedding data;
wherein the superposing is performed by replacing the rounding direction flag with the new rounding direction flag, based upon a logical calculation of a value of the rounding direction flag and a value of the embedding data.

17. A data extraction device according to claim 16, further comprising an auxiliary information storing unit storing auxiliary information indicating which bit pattern information among plural pieces of bit pattern information should be used,
wherein said pattern storing unit stores the plural pieces of bit pattern information, and
said calculating unit performs the calculation by use of the bit pattern specified by the bit pattern information indicated by the auxiliary information, among the plural pieces of bit pattern information stored on said pattern storing unit.

18. A data extraction device comprising:

a dynamic image storing unit storing inter-frame prediction coded dynamic image data into which embedding data embedded;

a frame segmenting unit segmenting a continuous frame in the inter-frame prediction coded dynamic image data into a plurality of sub-frames;

an extracting unit extracting a value of a rounding direction flag of the inter-frame prediction coded dynamic image data from each of the sub-frames;

an invert judging unit judging whether a value of the rounding direction flag in the sub-frame should be inverted or not; and an inverting unit inverting the value of the rounding direction flag in the relevant sub-frame on the basis of the judgement by said invert judging unit, and outputting the inverted value as the embedding data.

19. A data extraction device according to claim 18, wherein said frame segmenting unit segments the continuous frame into the sub-frames having a predetermined frame count.

20. A data extraction device according to claim 19, further comprising an auxiliary information receiving unit receiving auxiliary information corresponding to the predetermined frame count.

21. A data extraction device according to any one of claims 18 through 20, wherein said invert judging unit judges based on a value of the invert flag embedded into the rounding direction flag of the frame not segmented into the sub-frames.

* * * * *